United States Patent
Conwell

(10) Patent No.: US 8,039,805 B2
(45) Date of Patent: Oct. 18, 2011

(54) MULTI-SHORT-SCAN TECHNIQUE IN SPECT IMAGING

(75) Inventor: Richard Conwell, Del Mar, CA (US)

(73) Assignee: Digirad Corp, Poway, CA (US)

(*) Notice: Subject to any disclaimer, the term of this patent is extended or adjusted under 35 U.S.C. 154(b) by 0 days.

(21) Appl. No.: 12/763,258

(22) Filed: Apr. 20, 2010

(65) Prior Publication Data

US 2010/0200759 A1    Aug. 12, 2010

Related U.S. Application Data

(62) Division of application No. 11/940,190, filed on Nov. 14, 2007, now Pat. No. 7,700,921.

(60) Provisional application No. 60/865,914, filed on Nov. 15, 2006.

(51) Int. Cl.
*G01T 1/166* (2006.01)
(52) U.S. Cl. .................................... 250/363.04
(58) Field of Classification Search ............. 250/363.04, 250/363.07
See application file for complete search history.

(56) References Cited

U.S. PATENT DOCUMENTS

| | | | |
|---|---|---|---|
| 5,337,231 A | | 8/1994 | Nowak et al. |
| 5,444,252 A | * | 8/1995 | Hug et al. ................ 250/363.08 |
| 7,365,334 B1 | | 4/2008 | Gordon |
| 2007/0003021 A1 | | 1/2007 | Guertin et al. |
| 2007/0280508 A1 | | 12/2007 | Ernst et al. |
| 2010/0046817 A1 | * | 2/2010 | Goedicke et al. ............. 382/131 |

* cited by examiner

*Primary Examiner* — David Porta
*Assistant Examiner* — Marcus Taningco
(74) *Attorney, Agent, or Firm* — Law Office of Scott C. Harris, Inc.

(57) ABSTRACT

A SPECT system which scans over multiple separate scans and individually motion compensates the information obtained from each of these scans. The separate scans may be over different angular extents and may be for different purposes. One of the scans for example may be a scout scan, and the other scans may then be scans which concentrate on areas identified during the scout scan. Alternatively, the scans may all being exactly the same and stitched together after the individual motion compensation. Since each of the scans are shorter, the patient will presumably have moved less during each individual scan, and the amount of motion is hence presumably less.

6 Claims, 2 Drawing Sheets

MULTI-SHORT-SCAN TECHNIQUE IN SPECT IMAGING

This application is a continuation of U.S. Ser. No. 11/940, 190, filed Nov. 14, 2007, now U.S. Pat. No. 7,700,921, which claims priority from Provisional application No. 60/865,914, filed Nov. 15, 2006, the disclosure of which is herewith incorporated by reference herein.

BACKGROUND

In SPECT imaging, data acquisition is usually completed in a single scan. A scan usually obtains between 30 and 128 projection frames are acquired in a 180° to 360° angular range, depending upon the clinical protocols. SPECT often has a low count rate because of low system sensitivity and patient dose compared to other imaging modalities, such as CT. The SPECT scan hence takes a relatively long time, e.g., from minutes to tens of minutes Theoretically, SPECT imaging requires the patient to stay motionless during the entire scan. Any movement by the patient causes data inconsistency which may introduce motion artifacts into the final images.

However, it is very difficult to keep patients motionless during scans, and especially during longer scans. When the patient motion becomes too large, the data may not be medically usable. Patients are generally rescanned when this happens.

For example, for cardiac SPECT, ASNC guidelines specifically requires that if patient motion is larger than a certain amount at any of the projection frames, the patients need to be rescanned.

Wang et al (Wang et al 2005) used multiple acquisition of moderate length to reduce effects of radioactive decay for phantom experiments. Chen et al (Chen et al 2004) used multiple sequential scans (fast fanning) with 1 second per projection for dynamic SPECT using Teboroxime. However, neither of these works could be directly used to handle motion correction in SPECT imaging.

A number of motion correction techniques have been proposed for SPECT imaging. These efforts can be divided into two main categories. One is a hardware approach that tracks patient motion during patient scans using a tracking device and uses the motion information during image reconstruction to correct for the motion. The other analyzes the acquired data after the scan using software, where the data are acquired using the current single but relatively long scan approach.

The hardware approach is ideal for motion tracking and correction for patient studies, but the device can be complicated and expensive.

The software approaches are limited in their ability to correct for sub-frame patient motion. For example, if the scanning time for one frame is 20 seconds, and the patient moves only for the second half (10 seconds) of the acquisition of the frame, unless the data are acquired in list mode, none of the current motion correction techniques will operate properly.

SUMMARY

According to embodiments, a single photon image computed tomography scan is carried out to obtain multiple separate scans, each representing a medical image at least one portion of a body being imaged. According to an embodiment, the total amount of desired counts from the photons are obtained over multiple shorter scans as compared with over a single scan.

One embodiment may use two separate scans to obtain the total number of counts found the photon. Another embodiment may use four shorter scans or some other number of scans.

DETAILED DESCRIPTION

In clinical studies, patient motion is in general small and gradual. It is very difficult or impossible to determine the amount and direction of the movement without a real-time motion tracking device that provides on-the-fly information of patient motion. Most clinical SPECT systems lack such motion tracking devices. Hence, only after the scan is completed can one check if the patient has moved in the scan, and how much. If the motion is above the acceptable value, the patient then needs to be rescanned.

In practice, rescanning a patient has many disadvantages. One is the extra scanning time that is taken by the rescan, which results in lowered patient throughput and less certainty in the ability to schedule others. Another is the change of patient physiology and radiopharmaceutical distribution with time. Some radiopharmaceutical distributions change significantly with time, such as those with very short physiological half time or those which redistribute quickly in the organ/tissue of interest. With those agents, rescanning the patient may require the re-preparation of the patient, re-dose, re-exercise, etc, or even rescheduling of the patient. Also, since the fees for these medical procedures are in general capped by insurance, it may not be possible to charge any extra for a re-scan.

This disclosure describes a multi-short-scan technique in SPECT imaging as an alternative to the current single, relatively long scan approach for patient studies. This technique can be used to correct patient motion and reduce the chance of patient rescans.

Figure 1:
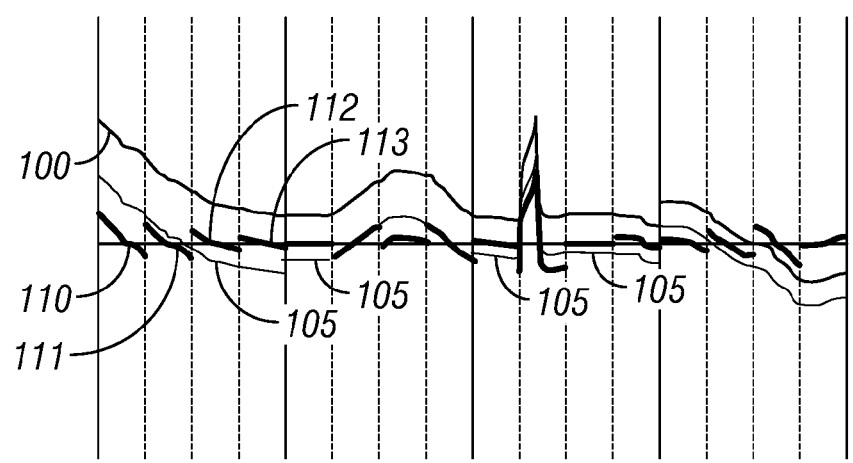
FIG. 1 illustrates how the multiple short scans can reduce the motion in each of the short scan data.

The inventor recognized, however, that several short scans have less overall motion in each of the short scans than a single long scan and allows for better motion correction. FIG. 1 illustrates a motion scenario. In FIG. 1, the line 105 shows a motion compensated scan when a single scan is used. In contrast, the lines 110, 111 112, 113 show compensation using four separated and short scans. The multiple motions may be better compensated during short scans than they are during a longer scan.

Instead of a single long scan for patient studies, this disclosure describes the use of multiple short scans. The short scans can be acquired with the same effective geometry or with different geometries for one or all of the short scans. This may allow (1) better motion correction, (2) identification of overlying tissue attenuation, and (3) better identification of region of interest to be scanned.

Patient motion in SPECT imaging can be gradual (such as slumping) or abrupt (such as coughing), or a combination of the two. When a single, long scan is used, the data is deteriorated by the overall motion during the whole scan. However, if multiple short scans are used, the data of each short scan is only deteriorated by the motion during that short scan. The motion during the short scans can be much smaller than the motion in the single, long scan. Hence, there is typically less data inconsistency over the course of the short scan. There is also the ability for a usually better motion correction using software for the motion in each of the short scans. Thus, the image of each of the short scans can be more accurate, i.e. have fewer motion artifacts than the image of the single, long acquisition.

Even though the multiple short scans will inherently have less motion therein than the longer time scans, the data from each of multiple short scans can still be motion-corrected.

If each short scan acquires data at exactly the same geometry, the data from the multiple short scans is subsequently added together for image reconstruction. Some simple registration is used for the adding process.

If the multiple short scans do not acquire data at exactly the same geometry, then one can reconstruct the image for each of the multiple short scans, and later apply some simple registration to add up the reconstructed images of each of the short scans to obtain the final image.

Another unexpected advantage comes from using multiple short scans instead of a single long scan. Specifically, if the multiple short scans acquire data in different angular ranges, then the reconstructed image of each of the multiple short scans may reveal different overlying tissue attenuation which may assist with the clinical interpretation of the images.

When multiple short scans are used, one can also reconstruct the image after each short scan. The first short scan is used to cover a large angular range, and is used as something similar to the "scout view" in CT imaging. Reconstruction from this "scout scan" data can help to identify regions that should receive the most scanning attention from the rest of the scans.

Using multiple short scans may allow for better motion correction for clinical applications than using a single long scan. Moreover, it may allow the short scans to cover different angular ranges so that they can reveal different imaging effects, such as overlying tissue attenuation. The "scout scan" scan together with other short scans will allow the identification of the region to be scanned and better usage of camera time by allowing improved sensitivity for the region of interest.

Another embodiment may use these techniques for cardiac SPECT imaging, where imaging time is relatively long and overlying tissue attenuation is critical for clinical interpretation. The techniques disclosed herein can also be used for SPECT oncology.

In SPECT oncology, a "scout scan" a short scan image shows different lesions. This image allows the identification of some lesions that are clear and some that are unclear, or some as benign or malignant but others are ambiguous (through SUV values). Using the scout scan image, one can dedicate the rest of the short scans to the regions where lesions are unclear or the physiological stage of the lesion is ambiguous.

Figure 2:
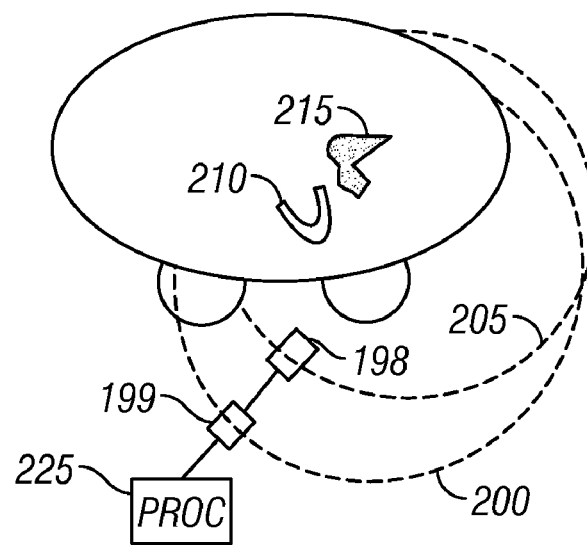
FIG. 2 illustrates multiple short scans that can reveal different overlying tissue attenuation effects.

FIG. 2 also shows the scanning camera 199 which may be a sensor of the type used for suspect detection. FIG. 2 shows the camera in a location where it can be scanned, and also shows how the camera can be moved to a second location 198 which scans over a different path. Alternatively, however, the patient can be moved to that different location, so that the patient's movement changes rather than the camera's movement.

FIG. 2 illustrates how multiple short scans can cover different angular ranges. For example, a first short scanned 200 may cover a first angular range, while a second short scanned 205 may cover a second angular range. Both of these ranges should ideally include the organ of interest 210, as well as other image items such as 215.

Figure 3:
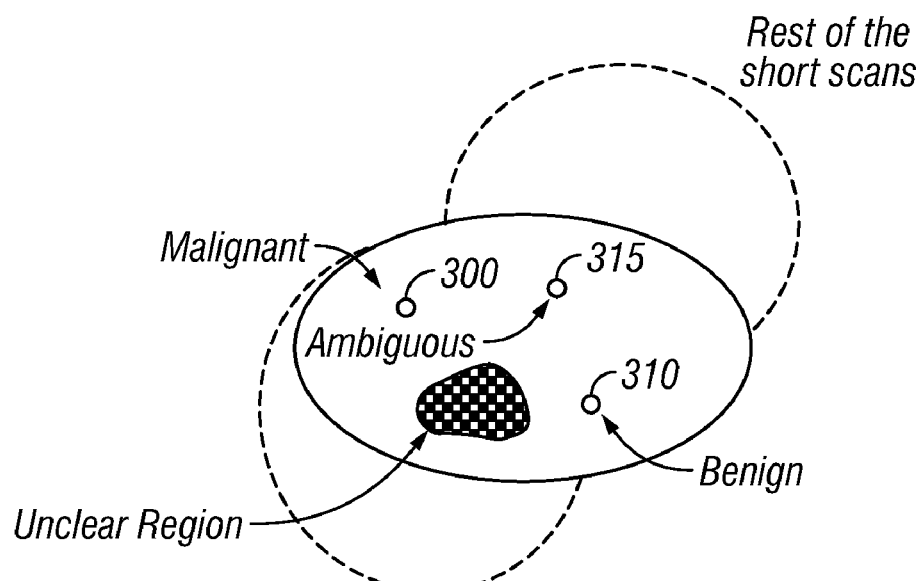
FIG. 3 illustrates an application of a scout scan technique.

FIG. 3 illustrates how a scout scan could be used. In this scout scan, different lesions can be identified. Some regions may be identifiable, such as 300, which is clearly identifiable as malignant, but other regions may be unclear, such as the region 305. Some may be completely clearly benign such as 310. Others, through use of the SUV values, may be ambiguous 315. The initial short scan can be used as a scout scan, followed by other scans being used to identify not identify to further process during those longer scans.

Mechanical devices and software can be used to rotate the camera relative to the patient according to the application of the embodiments, e.g., as shown in FIGS. 2 and 3 which shows relative rotation between the camera and patient. The mechanical devices and software can be used to minimize the time used for camera reconfiguration between the short scans.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of medical imaging systems could be used with this embodiment. Other differences between the scans could be used. Other compensations can be applied to the scans.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:
1. A method, comprising:
determining an amount of information for single photon emission computed tomography that needs to be acquired; and obtaining said amount of information over multiple different scans, each of which scans over a shorter range than a single range which would be necessary to obtain said number of amount of information, wherein said multiple different scans include a first scout scan that identifies regions of interest, and at least one other short scan that preferentially images said regions of interest as compared with other regions.

2. A method as in claim 1, wherein said at least one other short scans are shorter scans than said scout scan.

3. A method as in claim 1, further comprising compensating for motion of a patient individually during each of said multiple different scans, by individually motion compensating each of said multiple different scans completely individually from others of said multiple different scans.

4. A method as in claim 1, wherein said multiple different scans are done in a way that allows at least different scans to reveal different imaging effects.

5. A method as in claim 1, further comprising, after said scout scan, using contents of said scout scan to identify identifiable regions and unclear regions, and using at least one other scan to further process the unidentifiable regions.

6. A method as in claim 1, further comprising reconfiguring a scan path of a camera between said multiple different scans between a first path that covers a first angular extent of an imaged body, and a second path that covers a second angular extent of an imaged body.

* * * * *